US012627163B2

(12) United States Patent
Lee et al.

(10) Patent No.: US 12,627,163 B2
(45) Date of Patent: May 12, 2026

(54) APPARATUS AND METHOD FOR PROTECTING BATTERY PACK

(71) Applicant: SAMSUNG SDI CO., LTD., Yongin-si (KR)

(72) Inventors: Hwan Lee, Suwon-si (KR); Seung Hyeok Park, Suwon-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 0 days.

(21) Appl. No.: 18/410,792

(22) Filed: Jan. 11, 2024

(65) Prior Publication Data

US 2025/0149905 A1 May 8, 2025

(30) Foreign Application Priority Data

Nov. 7, 2023 (KR) ........................ 10-2023-0152515

(51) Int. Cl.
 *H02J 7/00* (2006.01)
 *B60L 3/00* (2019.01)
 *H01M 10/44* (2006.01)

(52) U.S. Cl.
 CPC ........... *H02J 7/0029* (2013.01); *H01M 10/44* (2013.01); *H02J 7/0047* (2013.01); *H02J 7/0063* (2013.01); *B60L 3/0046* (2013.01); *B60L 2240/545* (2013.01); *B60L 2240/547* (2013.01); *B60L 2240/549* (2013.01); *H01M 2220/20* (2013.01)

(58) Field of Classification Search
 CPC ...... H02J 7/0029; H02J 7/0063; H01M 10/44; H01M 2220/20; B60L 3/0046; B60L 2240/545; B60L 2240/547
 See application file for complete search history.

(56) References Cited

U.S. PATENT DOCUMENTS

| | | | | |
|---|---|---|---|---|
| 2008/0129249 A1* | 6/2008 | Ishishita | ............... | H01M 10/48 |
| | | | | 320/136 |
| 2009/0241883 A1* | 10/2009 | Nagoshi | .............. | F02N 11/0825 |
| | | | | 701/112 |
| 2010/0033135 A1* | 2/2010 | Nishida | ............... | H01M 10/443 |
| | | | | 320/136 |
| 2021/0165044 A1* | 6/2021 | Imura | ................ | G01R 31/3275 |

FOREIGN PATENT DOCUMENTS

WO      WO-2006121144 A1 * 11/2006   ............ B60L 3/0046

OTHER PUBLICATIONS

EPO Extended European Search Report dated Oct. 9, 2024, issued in corresponding European Patent Application No. 24164523.3 (10 pages).

* cited by examiner

*Primary Examiner* — Rexford N Barnie
*Assistant Examiner* — Duc M Pham
(74) *Attorney, Agent, or Firm* — Womble Bond Dickinson (US) LLP

(57) ABSTRACT

An apparatus for protecting a battery pack, includes: a battery module; a relay to apply an output of the battery module to a load of a vehicle, or block the output of the battery module; an actuator to operate by a power supplied from a starter battery; and a processor to: monitor the battery module when a start signal is input to detect a failure of the relay; and if the failure of the relay is detected, control the actuator to discharge the starter battery and block a start of the vehicle.

12 Claims, 6 Drawing Sheets

FIG. 4

APPARATUS AND METHOD FOR PROTECTING BATTERY PACK

CROSS-REFERENCE TO RELATED APPLICATION

The present application claims priority to and the benefit of Korean Patent Application No. 10-2023-0152515, filed on Nov. 7, 2023, in the Korean Intellectual Property Office, the entire disclosure of which is incorporated by reference herein.

BACKGROUND

1. Field

Aspects of embodiments of the present disclosure relate to an apparatus and method for protecting a battery pack in response to a failure of a relay of the battery pack.

2. Description of the Related Art

Unlike primary batteries that cannot be recharged, secondary batteries are capable of being charged and discharged. Low-capacity secondary batteries may be used in small portable electronic devices, such as smartphones, feature phones, laptop computers, digital cameras, camcorders, and the like. High-capacity secondary batteries are widely used as a power supply for driving motors of hybrid vehicles, electric vehicles, or the like, as well as for power storage batteries, and the like.

A secondary battery includes an electrode assembly including a positive electrode and a negative electrode, a case for accommodating the electrode assembly, and an electrode terminal connected to the electrode assembly.

Secondary batteries are charged by a charge current applied from the outside, and output a discharge current to supply the discharge current to a load.

In the secondary batteries, a relay connected to an output terminal may be turned on or turned off, and thus, the input of the charge current and the output of the discharge current may change.

The above information disclosed in this Background section is for enhancement of understanding of the background of the present disclosure, and therefore, it may contain information that does not constitute prior art.

SUMMARY

In order to control charging or discharging of secondary batteries, the secondary battery may include a battery management system (BMS)) that controls the operation of a relay according to magnitudes of a discharge current and a charge current.

In the case of electric vehicles or hybrid vehicles in which a secondary battery is installed in the vehicle, during driving according to the input of a starter key, a BMS may check the status of a battery module. If the battery module normally operates, the BMS may turn on a relay to supply power to the vehicle from the battery module for driving the vehicle.

When a failure of a battery module is detected, the BMS may block the output by turning off a relay, such that the output of the battery module may not be supplied to the vehicle.

However, relays may fail due to their own internal defects or due to environmental defects. When a failure of a relay occurs, because the output of a battery module may not be controlled by a BMS, accidents due to no control of the battery module may occur, which may lead to safety issues for vehicle occupants.

As such, some vehicles may include a plurality of relays designed in a dual structure, but when all of the plurality of relays fail, the same kind of safety issues for the vehicle occupants may be caused.

As such, apparatuses and methods to stably control the input and output of a battery module according to an operating state of a relay may be desired.

Embodiments of the present disclosure are directed to an apparatus and method for protecting a battery pack, in which the battery pack is stably controlled in response to a failure of a relay provided in the battery pack.

However, the aspects and features of the present disclosure are not limited to those described above, and other aspects and features will be clearly understood by those having ordinary skill in the art from the following description.

According to one or more embodiments of the present disclosure, an apparatus for protecting a battery pack, includes: a battery module; a relay configured to apply an output of the battery module to a load of a vehicle, or block the output of the battery module; an actuator configured to operate by a power supplied from a starter battery; and a processor configured to: monitor the battery module when a start signal is input to detect a failure of the relay; and if the failure of the relay is detected, control the actuator to discharge the starter battery and block a start of the vehicle.

In an embodiment, the processor may be further configured to: monitor the battery module when the start signal is input to detect a failure of the battery module; and in response to detecting the failure of the battery module, control the relay to block the output of the battery module.

In an embodiment, the processor may be further configured to: detect a failure of the battery module based on at least one of a temperature, a current, or a voltage of the battery module measured by a sensor; control the relay to be turned off if the battery module fails; and determine the failure of the relay based on the current of the battery module.

In an embodiment, if a failure of the battery module and the failure of the relay is detected, the processor may be further configured to maintain an ignition-off state of the vehicle by discharging the starter battery before an ignition of the vehicle is turned on by the start signal.

In an embodiment, the processor may be configured to transmit a control signal to the actuator through a local interconnect network (LIN) to cause the actuator to operate.

In an embodiment, the actuator may include at least one of a heater or a pump, and the at least one of the heater or the pump may be connected to the starter battery to operate.

According to one or more embodiments of the present disclosure, a method of protecting a battery pack, includes: monitoring, by a processor, a battery module when a start signal is input to detect a failure of a relay; applying, by the processor, a control signal to an actuator of a vehicle if the relay fails; operating the actuator using power supplied from a starter battery; and discharging the starter battery to turn an ignition of the vehicle off.

In an embodiment, to detect the failure of the relay, the method may further include: monitoring, by the processor, the battery module when the start signal is input; detecting, by the processor, a failure of the battery module; controlling the relay to block an output of the battery module in response to detecting the failure of the battery module; and detecting the failure of the relay.

In an embodiment, the failure of the battery module may be detected based on at least one of a temperature, a current, or a voltage of the battery module measured by a sensor.

In an embodiment, the failure of the relay may be detected based on a current of the battery module after the controlling of the relay.

In an embodiment, the applying of the control signal may include transmitting, by the processor, the control signal to the actuator through a local interconnect network (LIN) to cause the actuator to operate.

In an embodiment, the operating of the actuator may include supplying power from the starter battery to operate the actuator to discharge the starter battery.

In an embodiment, the actuator may include at least one of a heater or a pump connected to the starter battery.

In an embodiment, to turn the ignition of the vehicle off, the processor may maintain an ignition-off state of the vehicle by discharging the starter battery before the ignition of the vehicle is turned on by the start signal.

BRIEF DESCRIPTION OF DRAWINGS

The above and other aspects and features of the present disclosure will be more clearly understood from the following detailed description of the illustrative, non-limiting embodiments with reference to the accompanying drawings, in which:

FIG. 4 is a block diagram illustrating a configuration of an apparatus for protecting a battery pack according to one or more embodiments of the present disclosure.

DETAILED DESCRIPTION

Figure 1A:
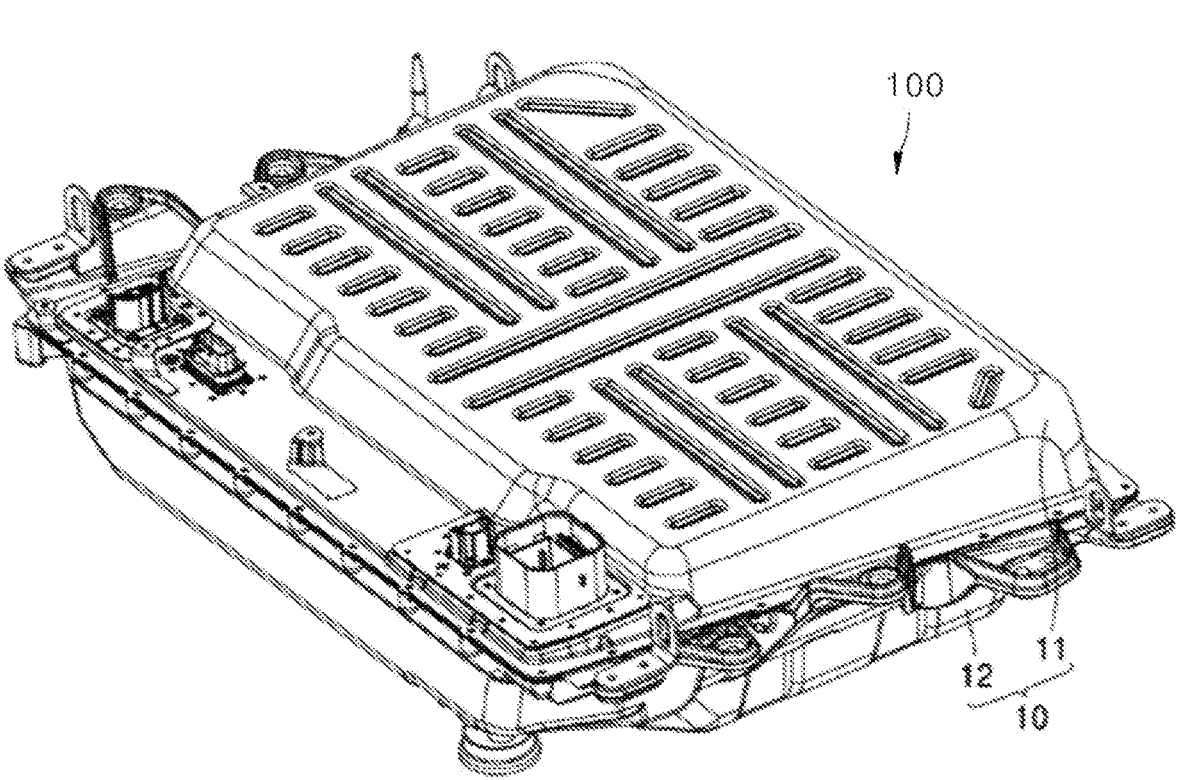
FIGS. 1A and 1B are views illustrating an example of a battery pack according to one or more embodiments of the present disclosure.

Hereinafter, embodiments will be described in more detail with reference to the accompanying drawings, in which like reference numbers refer to like elements throughout. The present disclosure, however, may be embodied in various different forms, and should not be construed as being limited to only the illustrated embodiments herein. Rather, these embodiments are provided as examples so that this disclosure will be thorough and complete, and will fully convey the aspects and features of the present disclosure to those skilled in the art. Accordingly, processes, elements, and techniques that are not necessary to those having ordinary skill in the art for a complete understanding of the aspects and features of the present disclosure may not be described. Unless otherwise noted, like reference numerals denote like elements throughout the attached drawings and the written description, and thus, redundant description thereof may not be repeated.

When a certain embodiment may be implemented differently, a specific process order may be different from the described order. For example, two consecutively described processes may be performed at the same or substantially at the same time, or may be performed in an order opposite to the described order.

In the drawings, the relative sizes, thicknesses, and ratios of elements, layers, and regions may be exaggerated and/or simplified for clarity. Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

It will be understood that when an element or layer is referred to as being "on," "connected to," or "coupled to" another element or layer, it can be directly on, connected to, or coupled to the other element or layer, or one or more intervening elements or layers may be present. Similarly, when a layer, an area, or an element is referred to as being "electrically connected" to another layer, area, or element, it may be directly electrically connected to the other layer, area, or element, and/or may be indirectly electrically connected with one or more intervening layers, areas, or elements therebetween. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments and is not intended to be limiting of the present disclosure. As used herein, the singular forms "a" and "an" are intended to include the plural forms as well, unless the context clearly indicates otherwise. It will be further understood that the terms "comprises," "comprising," "includes," "including," "has," "have," and "having," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. For example, the expression "A and/or B" denotes A, B, or A and B. Expressions such as "at least one of," when preceding a list of elements, modify the entire list of elements and do not modify the individual elements of the list. For example, the expression "at least one of a, b, or c," "at least one of a, b, and c," and "at least one selected from the group consisting of a, b, and c" indicates only a, only b, only c, both a and b, both a and c, both b and c, all of a, b, and c, or variations thereof.

As used herein, the term "substantially," "about," and similar terms are used as terms of approximation and not as terms of degree, and are intended to account for the inherent variations in measured or calculated values that would be recognized by those of ordinary skill in the art, for example, such as a variation or deviation of 5% or less. Additionally, uniformity of a parameter described for a certain area may refer to uniformity from an average perspective. Further, the use of "may" when describing embodiments of the present disclosure refers to "one or more embodiments of the present disclosure." As used herein, the terms "use," "using," and "used" may be considered synonymous with the terms "utilize," "utilizing," and "utilized," respectively.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Figure 1B:
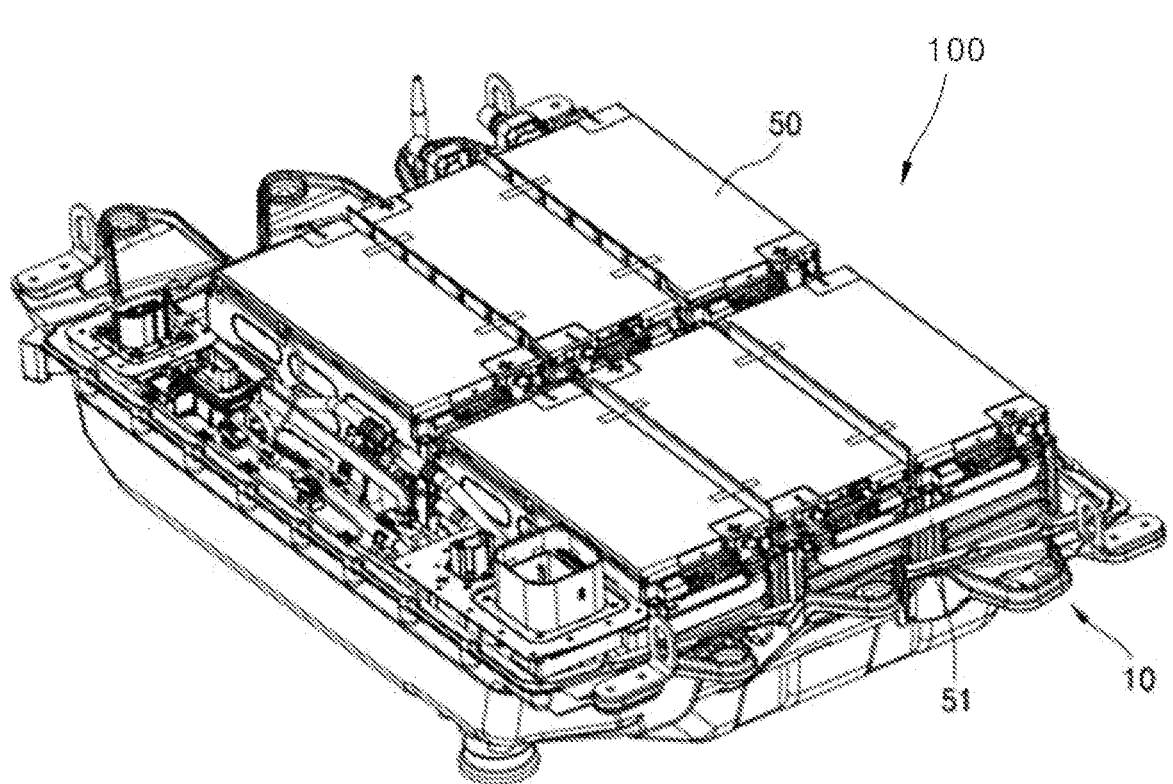

FIGS. 1A and 1B are views illustrating an example of a battery pack according to one or more embodiments of the present disclosure.

Referring to FIGS. 1A and 1B, a battery pack 100 may include a plurality of battery modules (e.g., a plurality of groups of battery cells) 50, and a housing 10 for accommodating the plurality of battery modules 50. For example, the housing 10 may include first and second housings 11 and 12 that are connected (e.g., coupled to) to each other with the plurality of battery modules 50 interposed therebetween. The plurality of battery modules 50 may be electrically connected to each other using a busbar 51. For example, the plurality of battery modules 50 may be electrically connected to each other in series, in parallel, or in a mixed series-parallel scheme to obtain a desired electrical output power.

The battery pack 100 includes one or more of the battery modules 50, and the pack housing 10 in which an accommodation space is formed to accommodate the one or more battery modules 50.

The battery module 50 may include a plurality of battery cells and a module housing. The battery cells may be accommodated in the module housing in a stacked form. The battery cell may include a positive electrode lead and a negative electrode lead. Depending on a desired shape of the battery, a circular type, a prismatic type, or a pouch type battery cell may be used.

In the battery pack 100, instead of the battery module 50, one cell stack may constitute one module. The cell stack may be accommodated in an accommodation space of the pack housing 10, or may be accommodated in an accommodation space partitioned by a frame, a partition, or the like.

The battery cell may generate a large amount of heat during charging/discharging. The generated heat may accumulate in the battery cell, and may accelerate degradation of the battery cell. Accordingly, the battery pack 100 may further include a cooling member to suppress the degradation of the battery cell. The cooling member may be provided at a lower portion of the accommodation space in which the battery cell is provided, but the present disclosure is not limited thereto. The cooling member may be provided at an upper portion or a side surface depending on the battery pack.

Each battery cell may experience an abnormal operating condition, for example, such as a thermal runaway or a thermal event in which an exhaust gas may be discharged to the outside of the battery cell. The battery pack 100 or battery module 50 may include an exhaust port for discharging the exhaust gas to prevent or substantially prevent damage to the battery pack 100 and/or the battery module 50.

The battery pack 100 may include the battery module 50, and a battery management system (BMS) for managing the battery module 50. The BMS may include a detection device, a balancing device, and a control device. The battery module 50 may include a plurality of cells that are connected to each other in series or in parallel. The battery modules 50 may be connected to each other in series or in parallel.

Figure 2:
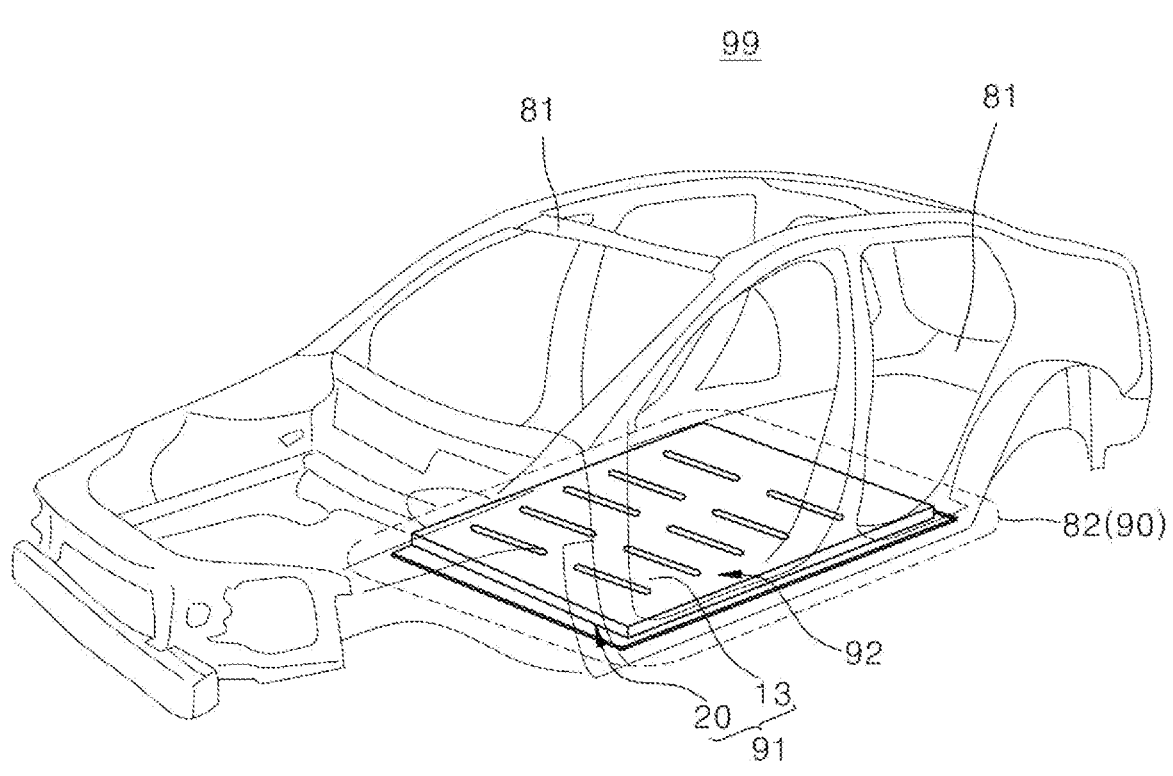
FIG. 2 is a view of a vehicle body in which a battery pack is installed according to one or more embodiments of the present disclosure.

FIG. 2 is a view of a vehicle body in which a battery pack is installed according to one or more embodiments of the present disclosure.

Referring to FIG. 2, a battery pack 91 may include a battery pack cover 13 that is a part of a vehicle underbody 92, and a pack frame 20 disposed below the vehicle underbody 92. The pack frame 20 and the battery pack cover 13 may be formed integrally with a vehicle bottom 82. In some embodiments, the pack frame 20 may correspond to the pack housing 10 described above with reference to FIGS. 1A and 1B.

The vehicle underbody 92 separates the interior from the exterior of the vehicle 99, and the pack frame 20 may be disposed on the exterior of the vehicle 99.

Figure 3:
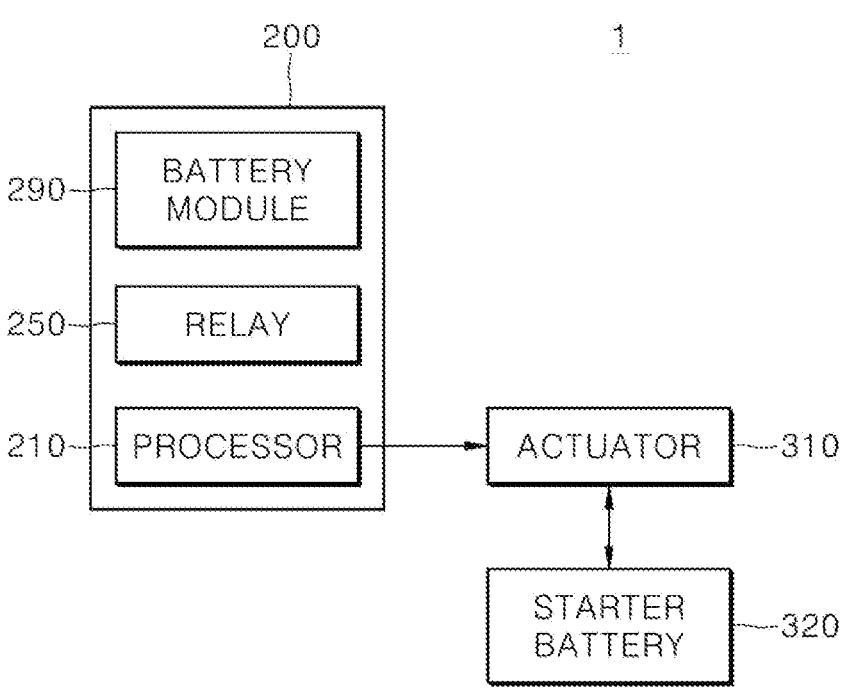
FIG. 3 is a block diagram illustrating a configuration of a battery pack of an apparatus for protecting the battery pack and a vehicle according to one or more embodiments of the present disclosure.

FIG. 3 is a block diagram illustrating a configuration of a battery pack of an apparatus for protecting the battery pack and a vehicle according to one or more embodiments of the present disclosure.

Referring to FIG. 3, an apparatus 200 for protecting a battery pack according to one or more embodiments of the present disclosure may include a battery pack (e.g., see 100 in FIGS. 1A and 1B), an actuator 310, and a starter battery 320, which are provided in a vehicle 1.

The battery pack may include a relay 250, a battery module (e.g., a battery) 290, and a processor 210.

The relay 250 may output a discharge current of the battery module 290 to a load of the vehicle 1, or may block the output of the discharge current.

The processor 210 may monitor a state of the battery module 290, and may calculate a state of charge (SOC).

In addition, in response to the state of the battery module 290, the processor 210 may control a charge current applied to the battery module 290, or a discharge current applied from the battery module 290 to the load of the vehicle 1.

The processor 210 may turn on the relay 250 that is provided at an output terminal of the battery pack 100 to supply the discharge current of the battery module 290 to the load of the vehicle 1, and may turn off the relay to block the output of the discharge current of the battery module 290.

The processor 210 may monitor the state of the battery module 290, and if a failure is detected, may control the relay 250 to block the output of the battery module 290.

In more detail, if an abnormality of the battery module 290 is detected in a situation in which the vehicle 1 is started, the processor 210 may control the relay 250 to block the output, thereby preventing the ignition of the vehicle from being turned on.

During control of the relay 250, if a failure of the relay 250 is detected, the processor 210 may not control the output of the battery module 290 through the relay 250, and thus, may perform a control so that an error is output.

In addition, the processor 210 may control the actuator 310 to prevent the ignition of the vehicle 1 from being turned on. The processor 210 may apply a signal to the actuator 310 to control the operation of the actuator 310 provided in the vehicle 1.

In a situation in which the output of the battery module 290 cannot be controlled due to a failure of the relay 250, the processor 210 controls the actuator 310 to prevent the ignition of the vehicle 1 from being turned on.

The actuator 310 is one of the components or devices provided in the vehicle 1, and operates according to a supplied current. For example, the actuator 310 may include a heater for the vehicle 1, or a heat pump for cooling the vehicle 1.

The processor 210 operates the actuator 310 if the relay 250 fails. In this case, the actuator 310 may operate by receiving an operating power from the starter battery 320.

The starter battery 320 may be a 12V battery that supplies power when the vehicle is started.

The starter battery 320 is discharged after a time (e.g., a certain or predetermined time) due to the operation of the actuator 310.

The processor 210 may control the start of the vehicle 1 by discharging the starter battery 320 through the actuator 310 before the ignition of the vehicle 1 is turned on.

The vehicle 1 may not be started due to the discharging of the starter battery 320.

Accordingly, in one or more embodiments of the present disclosure, in a situation in which the vehicle is started, if a failure of the battery pack 100 is detected, the ignition of the vehicle may be prevented from being turned on, thereby, preventing or substantially preventing vehicle accidents.

Figure 4:
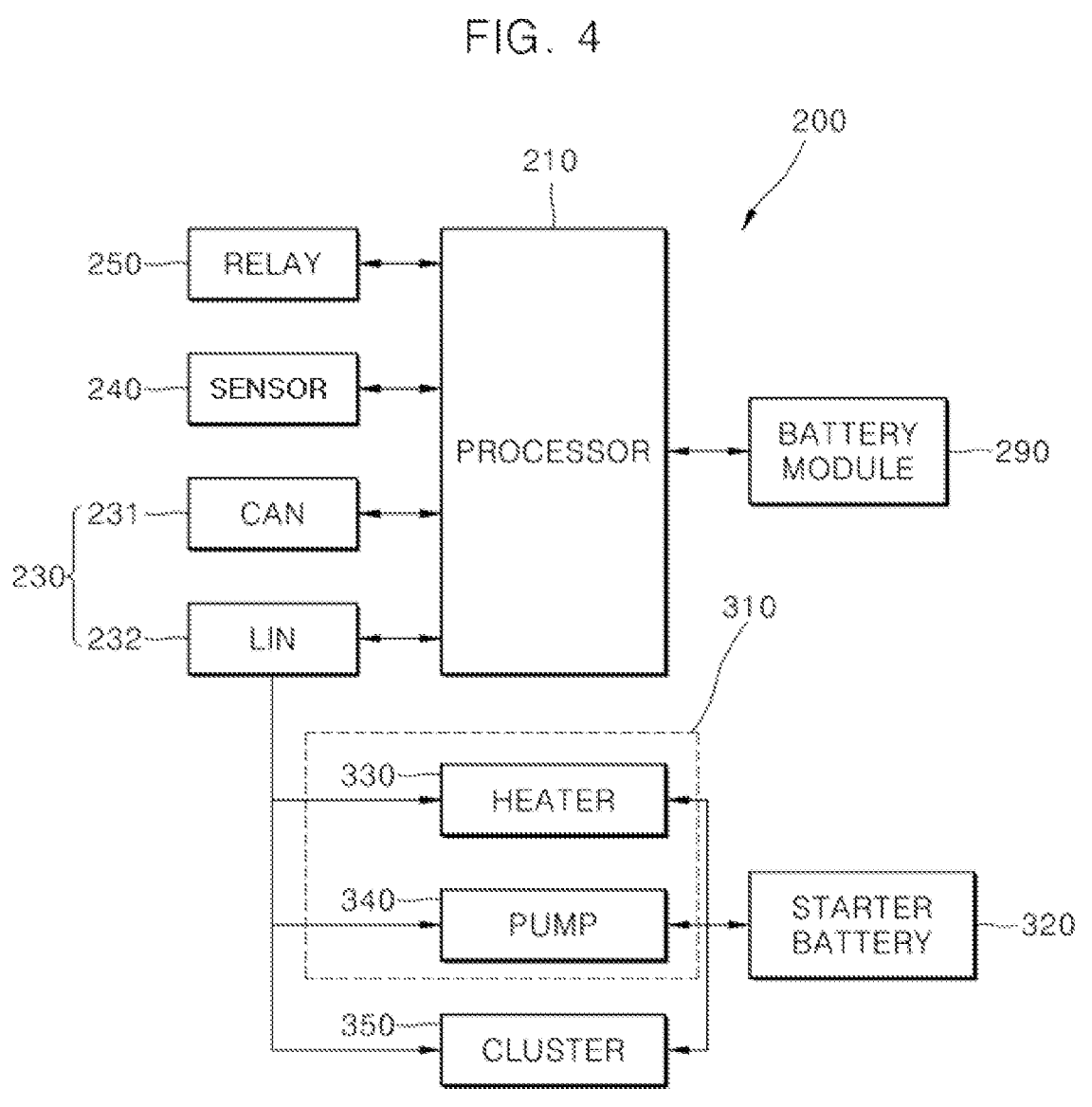

FIG. 4 is a block diagram illustrating a configuration of an apparatus for protecting a battery pack according to one or more embodiments of the present disclosure.

Referring to FIG. 4, an apparatus 200 for protecting a battery pack according to one or more embodiments of the present disclosure may include a battery module (e.g., a group of a plurality of battery cells) 290, a relay 250, a sensor 240, a communication unit (e.g., a communication network) 230, and a processor 210.

In addition, the apparatus 200 for protecting a battery pack may include an actuator 310, a cluster (e.g., a dashboard) 350, and a starter battery 320. The actuator 310 may include a heater 330 and a pump (e.g., a heat pump) 340.

The sensor 240 may include at least one of a current sensor, a voltage sensor, and/or a temperature sensor.

The temperature sensor measures a temperature of the battery module 290, and provides a measurement result to the processor 210. The current sensor measures a charge current or a discharge current of the battery module 290, and provides a measurement result to the processor 210. The voltage sensor measures a voltage of the battery module 290, and provides a measurement result to the processor 210.

The communication unit 230 transmits or receives data between the processor 210, the battery module 290, the sensor 240, and the relay 250. In addition, the communication unit 230 may transmit or receive data between the processor 210, the heater 330, the pump 340, and the cluster 350.

The communication unit 230 may include a controller area network (CAN) communication module (e.g., a CAN communication device) 231 including a driver for CAN communication, and a local interconnect network (LIN)

communication module (e.g., a LIN communication device) 232 including a driver for LIN communication.

The LIN communication module 232 may transmit a control signal of the processor 210 to the heater 330 and the pump 340, which are parts of the actuator 310.

In addition, the LIN communication module 232 may transmit a control signal of the processor 210 to the cluster 350.

Although an example in which the LIN communication module 232 and the actuator 310 are connected to each other is illustrated in FIG. 4, a control signal of the processor 210 may also be transmitted through the CAN communication module 231.

The relay 250 is provided at an output terminal of the battery pack 100, and operates according to a control command of the processor 210. The relay 250 is turned on to output a discharge current of the battery module 290 to a load of the vehicle, and allow a charge current from a charger to be applied to the battery module 290. The relay 250 is turned off to block the charge current and discharge current.

For example, the relay 250 may include a mechanical contactor that is turned on or turned off by a magnetic force of a coil. In addition, instead of the relay 250, a semiconductor switch, such as a metal oxide semiconductor field effect transistor (MOSFET), may be used.

The processor 210 may monitor a state of the battery module 290 through the sensor 240, and may calculate an SOC. In addition, the processor 210 may detect a failure of the battery module 290.

If a temperature measured through the sensor 240 is higher than or equal to a set temperature, and if an overcurrent or overvoltage is detected, the processor 210 may determine a failure of the battery module 290.

The processor 210 may control the relay 250 in response to a failure of the battery module 290. If the processor 210 determines that the battery module 290 has failed due to at least one of a high temperature, an overcurrent, and/or an overvoltage, the processor 210 applies a control command to the relay 250 to turn off the relay 250.

When the relay 250 is turned off, the output of the battery module 290 may be blocked without being applied to the load of the vehicle 1.

When a starter key of the vehicle 1 is input, the processor 210 may determine whether or not the battery module 290 is operating normally before the vehicle is started.

The processor 210 may include any one of a battery management system (BMS), a battery pack control module (BPCM), a central processing unit (CPU), an electronic control unit (ECU), and/or a micro controller unit (MCU).

If a failure of the battery module 290 is detected before the ignition of the vehicle is turned on, the processor 210 may control the relay 250 to block the output of the battery module 290. Because the relay 250 is turned off, a discharge current of the battery module 290 is blocked without being supplied to the load of the vehicle 1.

In this case, the processor 210 may determine whether or not an operating state of the relay 250 is normal in response to a current measured through the sensor 240.

After the processor 210 controls the relay 250 to be turned off, if a discharge current of the battery module 290 is output, the processor 210 may determine that the relay 250 has failed.

The processor 210 cannot control the output of the battery module 290 when the relay 250 fails, and thus, may control the actuator 310 to turn the ignition off before the ignition of the vehicle 1 is turned on. In other words, the actuator 310 may prevent the ignition of the vehicle 1 from being turned on.

The processor 210 may transmit a control signal to the actuator 310 through the LIN communication module 232.

The processor 210 transmits a control signal to at least one of the heater 330 and/or the pump 340, which are included in the actuator 310, that is operated by the starter battery 320. In this case, the actuator 310 may include any suitable device as long as the device is operated by power supplied from the starter battery 320. However, a device that consumes a large amount of power for a short time may be desired to be used as the actuator 310.

At least one of the heater 330 and/or the pump 340 may start to operate according to the control signal. The heater 330 and/or the pump 340 may start to operate based on power supplied from the starter battery 320, and may control an internal temperature of the vehicle 1.

In this case, the starter battery 320 may be a 12V battery, and may be discharged within a time (e.g., a certain or predetermined time) due to the operations of the heater 330 and the pump 340.

Accordingly, if a failure of the battery pack 100 is detected in a starting situation, the processor 210 may control the relay 250 to block the output of the battery module 290. If the relay 250 fails, the processor 210 may control the actuator 310 to discharge the starter battery 320, thereby, allowing the vehicle to maintain an off-state without the ignition being turned on.

If the battery pack 100 fails, because the vehicle 1 cannot drive normally, the processor 210 may control (e.g., may prevent) the start of the vehicle 1 to prevent accidents.

The processor 210 may generate failure information, and may output an error in response to a failure of the battery module 290 and a failure of the relay 250. The processor 210 may control any one of the CAN communication module 231 and/or the LIN communication module 232 of the communication unit 230 to transmit the failure information to the cluster 350.

The processor 210 may control the cluster 350 to output the failure information through the cluster 350. In addition, the processor 210 may transmit the failure information to a main processor of the vehicle through the communication unit 230. In this case, the main processor may output the failure information through the cluster 350.

The cluster 350 may output an error according to the failure information in the form of at least one of a warning light, a warning message, and/or a warning sound. The cluster 350 may output an error regarding either the battery pack 100 or the relay 250.

The processor 210 allows error output through the cluster 350 to be maintained or substantially maintained, until a separate reset signal is input.

Figure 5:
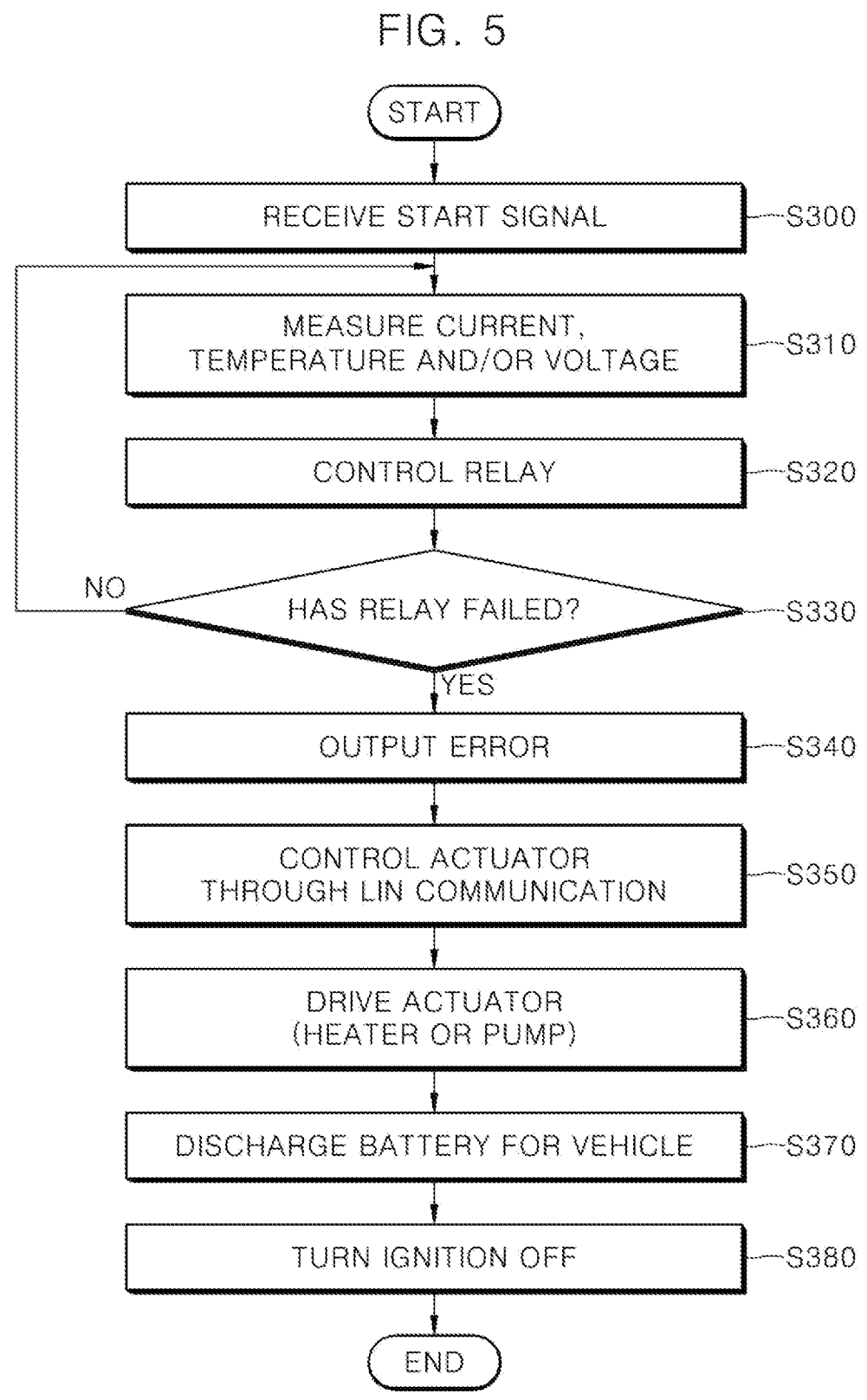
FIG. 5 illustrates a method of protecting a battery pack according to one or more embodiments of the present disclosure.

FIG. 5 illustrates a method of protecting a battery pack according to one or more embodiments of the present disclosure.

Referring to FIG. 5, a start signal is input (e.g., received) (S300), and a processor 210 measures a current, a temperature, and/or a voltage of a battery module 290 through measurement data of a sensor 240 (S310). For example, in some embodiments, the start signal may be input when the ignition is turned to the on position.

The processor 210 may determine a failure of the battery module 290 based on the measurement data of the sensor 240.

The processor 210 may determine that the battery module 290 has failed for at least one of a case in which the temperature of the battery module 290 is higher than or equal to a set temperature, a case in which the current of the battery module 290 is an overcurrent, and/or a case in which an overvoltage is measured.

If it is determined that the battery module 290 has failed, the processor 210 controls a relay 250 to be turned off (S320).

The processor 210 controls the relay 250 to be turned off, and may then measure a current through the sensor 240 to check an operating state of the relay 250.

If the relay has failed (S330), the processor 210 generates failure information, and outputs an error (S340).

If a discharge current of the battery module 290 is output through the relay 250, the processor 210 may determine that the relay 250 has failed.

The processor 210 controls any one of a CAN communication module 231 and/or a LIN communication module 232 of a communication unit 230 to transmit the failure information to a cluster (e.g., a dashboard) 350. The processor 210 may perform control so that the failure information is output through the cluster 350.

The cluster 350 may output an error regarding a failure of the battery module 290 and a failure of the relay 250.

In addition, the processor 210 may transmit a control signal to at least one of a heater 330 and/or a pump (e.g., a heat pump) 340, which are actuators 310 or included in the actuator 310, through the LIN communication module 232 (S350).

The processor 210 controls at least one of the heater 330 and/or the pump (e.g., the heat pump) 340 to operate through the control signal.

In this case, the processor 210 may transmit the control signal to turn-on/turn-off the actuator 310 to control the actuator 310 using the LIN communication module 232, which may have a relatively simple protocol configuration.

The actuator 310 may start to operate according to the received control signal (S360). In other words, the actuator 310 may be driven. The actuator 310 operates by receiving operating power from a starter battery 320 connected thereto.

The starter battery 320 may be discharged due to the operation of at least one of the heater 330 and/or the pump 340 (S370).

Accordingly, if a failure is detected in the battery pack 100 in a starting situation, before the ignition of a vehicle is turned on, the starter battery 320 may be discharged to block operating power, thereby, controlling the vehicle 1 to maintain an ignition-off state (S380).

According to an apparatus and method of protecting a battery pack of one or more embodiments of the present disclosure, in a situation in which a vehicle is started, a failure of a battery module and a relay may be detected to block the output of the battery module, and allow occupants to recognize the failure. In addition, according to one or more embodiments of the present disclosure, in a situation in which a vehicle is started, if a failure of the relay is detected, and thus, the output of the battery module cannot be controlled, an actuator may operate to discharge a starter battery, so that it may be possible to effectively control the vehicle to prevent the ignition from being turned on, thereby, preventing accidents due to a failure of the battery pack.

According to one or more embodiments of the present disclosure, in response to a failure of a battery pack and a relay, a starter battery may be discharged to stably turn off the ignition of a vehicle (or may prevent the ignition of the vehicle from being turned on), and the occupants and the vehicle may be protected from accidents.

According to one or more embodiments of the present disclosure, failure information may be output through a cluster of a vehicle to allow occupants to recognize an abnormality of a battery pack, thereby allowing a quick response to a failure.

However, the aspects and features of the present disclosure are not limited to those described above, and additional aspects and features may be apparent from the description, or may be learned by practicing one or more of the presented embodiments of the present disclosure.

Implementations described herein may be implemented in, for example, a method or process, an apparatus, a software program, a data stream, or a signal. Although discussed only in the context of a single form of implementation (e.g., discussed only as a method), implementations of the discussed features may also be implemented in other forms (for example, an apparatus or a program). The apparatus may be implemented in suitable hardware, software, firmware, and the like. A method may be implemented in an apparatus such as a processor, which is generally a computer, a microprocessor, an integrated circuit, a processing device including a programmable logic device, or the like. Processors also include communication devices such as a computer, a cell phone, a portable/personal digital assistant ("PDA"), and other devices that facilitate communication of information between end-users.

Here, the processor may be implemented as a central processing unit (CPU) or a system on chip (SoC), may drive an operating system or application to control a plurality of hardware or software components connected to the processor, and may process various pieces of data and perform calculations. The processor may be configured to execute at least one instruction stored in a memory, and store execution result data in the memory. The memory may include a random access memory (RAM), or other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the example embodiments of the present disclosure.

The foregoing is illustrative of some embodiments of the present disclosure, and is not to be construed as limiting thereof. Although some embodiments have been described, those skilled in the art will readily appreciate that various modifications are possible in the embodiments without departing from the spirit and scope of the present disclosure. It will be understood that descriptions of features or aspects within each embodiment should typically be considered as available for other similar features or aspects in other embodiments, unless otherwise described. Thus, as would be apparent to one of ordinary skill in the art, features, characteristics, and/or elements described in connection with a particular embodiment may be used singly or in combination with features, characteristics, and/or elements described in connection with other embodiments unless otherwise specifically indicated. Therefore, it is to be understood that the foregoing is illustrative of various example embodiments and is not to be construed as limited to the specific embodiments disclosed herein, and that various modifications to the disclosed embodiments, as well as other example embodiments, are intended to be included within the spirit and scope of the present disclosure as defined in the appended claims, and their equivalents.

What is claimed is:

1. An apparatus for protecting a battery pack, comprising:
a battery module;
a relay configured to apply an output of the battery module to a load of a vehicle, or block the output of the battery module;
an actuator configured to operate by a power supplied from a starter battery external to the battery module and for powering ignition of the vehicle; and
a processor configured to:
monitor the battery module when a start signal is input to detect a failure of the relay
if the failure of the relay is detected, control the actuator to discharge the starter battery and block a start of the vehicle,
wherein, if a failure of the battery module and the failure of the relay is detected, the processor is further configured to maintain an ignition-off state of the vehicle by discharging the starter battery before an ignition of the vehicle is turned on by the start signal.

2. The apparatus of claim 1, wherein the processor is further configured to:
monitor the battery module when the start signal is input to detect a failure of the battery module; and
in response to detecting the failure of the battery module, control the relay to block the output of the battery module.

3. The apparatus of claim 1, wherein the processor is further configured to:
detect a failure of the battery module based on at least one of a temperature, a current, or a voltage of the battery module measured by a sensor;
control the relay to be turned off if the battery module fails; and
determine the failure of the relay based on the current of the battery module.

4. The apparatus of claim 1, wherein the processor is configured to transmit a control signal to the actuator through a local interconnect network (LIN) to cause the actuator to operate.

5. The apparatus of claim 4, wherein the actuator includes at least one of a heater or a pump, and
wherein the at least one of the heater or the pump is connected to the starter battery to operate.

6. A method of protecting a battery pack, comprising:
monitoring, by a processor, a battery module when a start signal is input to detect a failure of a relay;
applying, by the processor, a control signal to an actuator of a vehicle if the relay fails;
operating the actuator using power supplied from a starter battery external to the battery module and for powering ignition of the vehicle; and
discharging the starter battery to turn an ignition of the vehicle off,
wherein to turn the ignition of the vehicle off, the processor maintains an ignition-off state of the vehicle by discharging the starter battery before the ignition of the vehicle is turned on by the start signal.

7. The method of claim 6, wherein to detect the failure of the relay, the method further comprises:
monitoring, by the processor, the battery module when the start signal is input;
detecting, by the processor, a failure of the battery module;
controlling the relay to block an output of the battery module in response to detecting the failure of the battery module; and detecting the failure of the relay.

8. The method of claim 7, wherein the failure of the battery module is detected based on at least one of a temperature, a current, or a voltage of the battery module measured by a sensor.

9. The method of claim 7, wherein the failure of the relay is detected based on a current of the battery module after the controlling of the relay.

10. The method of claim 6, wherein the applying of the control signal comprises transmitting, by the processor, the control signal to the actuator through a local interconnect network (LIN) to cause the actuator to operate.

11. The method of claim 6, wherein the operating of the actuator comprises supplying power from the starter battery to operate the actuator to discharge the starter battery.

12. The method of claim 11, wherein the actuator comprises at least one of a heater or a pump connected to the starter battery.

\* \* \* \* \*